(12) United States Patent
Lacaze et al.

(10) Patent No.: US 11,377,104 B2
(45) Date of Patent: Jul. 5, 2022

(54) AUTONOMOUS WASTE COLLECTION TRUCK

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 204 days.

(21) Appl. No.: 16/520,456

(22) Filed: Jul. 24, 2019

(65) Prior Publication Data
US 2021/0024068 A1   Jan. 28, 2021

(51) Int. Cl.
*B60W 30/18* (2012.01)
*G05D 1/00* (2006.01)
*B60W 10/04* (2006.01)

(52) U.S. Cl.
CPC ............ *B60W 30/18* (2013.01); *B60W 10/04* (2013.01); *G05D 1/0088* (2013.01); *B60W 2300/12* (2013.01); *B60W 2420/52* (2013.01); *B60W 2554/00* (2020.02); *B60W 2720/106* (2013.01)

(58) Field of Classification Search
None
See application file for complete search history.

(56) References Cited

U.S. PATENT DOCUMENTS

| 5,007,786 | A | | 4/1991 | Bingman | |
|---|---|---|---|---|---|
| 5,222,853 | A | | 6/1993 | Carson | |
| 5,911,463 | A | * | 6/1999 | Fesko | ...................... A45C 3/00 |
| | | | | | 294/152 |
| 10,095,240 | B2 | * | 10/2018 | Rodoni | ...................... B65F 3/02 |
| 2004/0055802 | A1 | * | 3/2004 | Pillar | ...................... H04L 29/06 |
| | | | | | 180/170 |
| 2010/0179912 | A1 | * | 7/2010 | Curotto | .................. G01G 23/42 |
| | | | | | 705/308 |

(Continued)

FOREIGN PATENT DOCUMENTS

| CN | 205258158 U | 12/2015 |
|---|---|---|
| CN | 106144346 A | 7/2016 |
| CN | 107918316 A | 11/2017 |

OTHER PUBLICATIONS

Kilcarr, "Fleet Owner", vol. 100, Issue 8, Aug. 2005 (Year: 2005).*

(Continued)

*Primary Examiner* — Tamara L Weber
(74) *Attorney, Agent, or Firm* — RowanTree Law Group, PLLC; Carson C. K. Fincham

(57) ABSTRACT

The invention being presented here automates the functions of the driver of the garbage truck. It involves a waste collection truck designed to follow routes to collect waste using a human to pick up the bins with refuse or other material comprising a truck that includes a drive-by-wire kit, a database storing the collection routes, a mechanism for detecting the position of the human which collects the waste bins and empties them on the back of the truck and a control mechanism that follows the assigned route and speeds or slows down the truck as to minimize the distance that the human will need to walk to empty the trash in the back of the waste collection truck.

4 Claims, 7 Drawing Sheets

(56) References Cited

U.S. PATENT DOCUMENTS

| | | | | |
|---|---|---|---|---|
| 2014/0314530 | A1* | 10/2014 | Strom | B65F 3/001 |
| | | | | 414/406 |
| 2015/0025708 | A1* | 1/2015 | Anderson | A61B 5/02055 |
| | | | | 701/2 |
| 2017/0123423 | A1* | 5/2017 | Sako | G05D 1/0088 |
| 2017/0148313 | A1* | 5/2017 | Zografos | G06Q 10/06312 |
| 2018/0029797 | A1* | 2/2018 | Hance | B25J 19/023 |
| 2018/0164828 | A1* | 6/2018 | Dumitras | B25J 9/1676 |
| 2018/0319381 | A1* | 11/2018 | Vitale | B60T 7/18 |
| 2019/0279169 | A1* | 9/2019 | Ivanovic | G06Q 10/06311 |
| 2020/0242944 | A1* | 7/2020 | Barberis | G06Q 50/30 |
| 2020/0369468 | A1* | 11/2020 | Searle | G06K 9/00791 |

OTHER PUBLICATIONS

Lipson et al., "Driverless: Intelligent Cars and the Road Ahead", p. 191-196, 2016 (Year: 2016).*

* cited by examiner

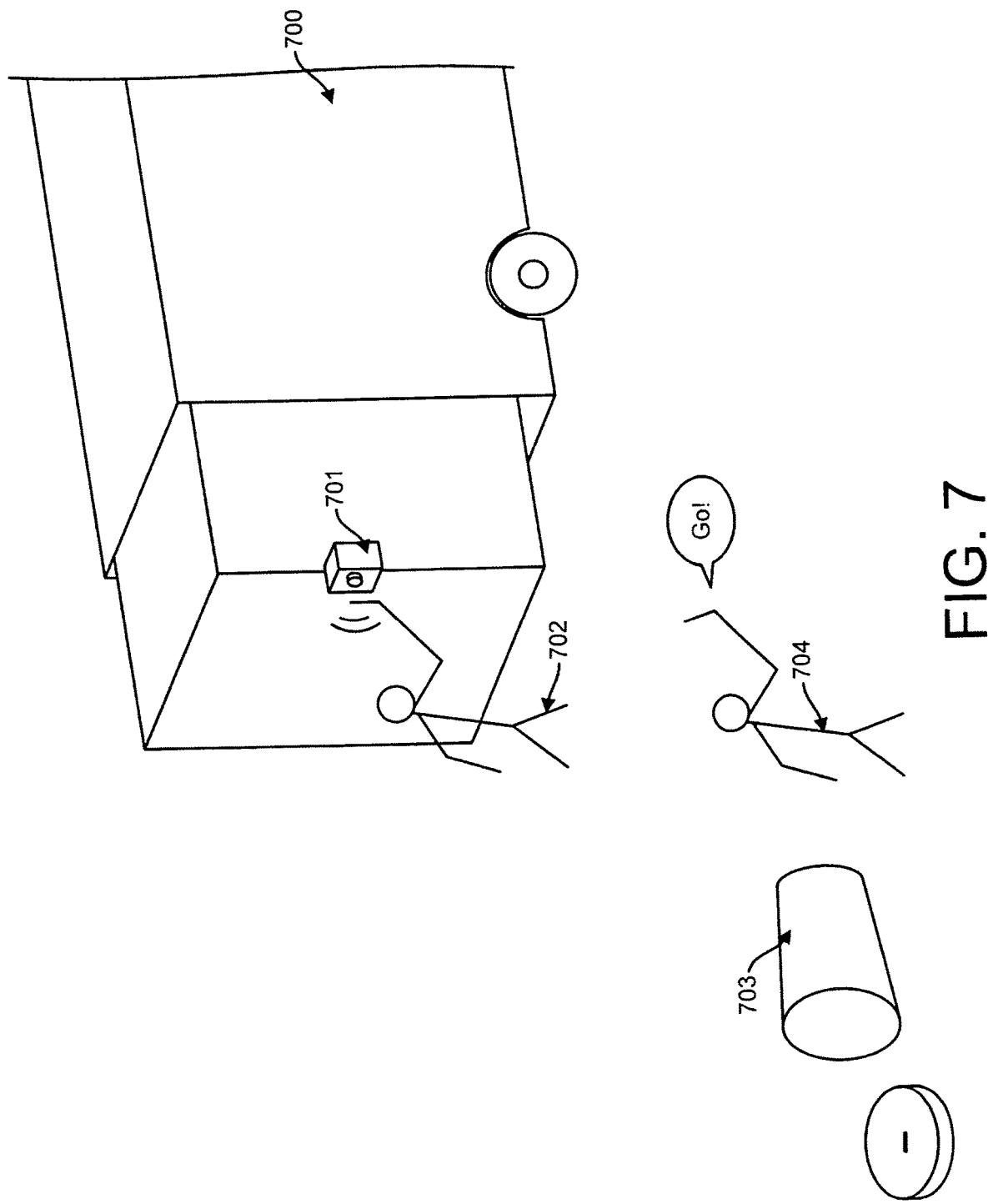

AUTONOMOUS WASTE COLLECTION TRUCK

CROSS-REFERENCES TO RELATED APPLICATIONS

None.

BACKGROUND

1. Field of the Invention

The invention disclosed here automates the functions of the driver of the waste collections truck. It involves a waste collections truck designed to follow routes to collect waste using a human to pick up the bins with refuse or other material comprising a truck that includes a drive-by-wire kit, a database storing the collection routes, a mechanism for detecting the position of the human which collects the waste bins and empties them on the back of the truck and a control mechanism that follows the assigned route and speeds or slows down the truck as to minimize the distance that the human will need to walk to empty the trash in the back of the waste collections truck. In addition, robots will be used to replace the human workers who empty the waste bins.

2. Description of Related Art

The statements in this section merely provide background information related to the present disclosure and may not constitute prior art.

Several types of waste collection vehicles exist including front loaders, rear loaders, automated side loaders, and grapple trucks. They are typically utilized to pick up quantities of waste for hauling to a pre-determined area, such as a landfill, transfer station, or material recovery facility. Waste collection vehicles can be further utilized or modified to collect recyclables for transport to a recycling facility. The allocation of waste removal equipment has been improved by the use of large trucks having compaction capabilities extending their effective range and capacity between unloadings. Furthermore, the vehicles may include specialized hoists to lift trash containers into the truck.

An increasing trend towards developing automated or semi-automated equipment is present in today's work environment. In some situations, with the trend, this equipment is completely different from the operator-controlled equipment that is being replaced and does not allow for any situations in which an operator can be present or take over operation of the vehicle. Such unmanned equipment can be unreliable due to the complexity of systems involved, the current status of computerized control, and uncertainty in various operating environments. As a result, semi-automated equipment is more commonly used. This type of equipment is similar to previous operator-controlled equipment but incorporates one or more operations that are automated rather than operator controlled. This semi-automated equipment allows for human supervision and allows the operator to take control when necessary.

There have been no reports in the patent literature that are related to the automation of the function of the driver of the waste collections truck in combination with using robots to empty the waste bins. Current systems are designed to have the driver of the truck and the control mechanism to make sure that the truck minimizes the work performed by the humans picking up the bins and this process can be readily and economically performed using current technology.

There has been an automatic garbage truck developed along with an automatic machine hand as discussed in CN205258158U. It embraces the tight garbage bin of bucket alignment clip. An automatic compartment intelligently processes garbage and comprises a compartment body, a smashing device, and a collecting device. However, this invention does not automate the function of the driver of the waste collections truck.

An intelligent garbage recovery system has, and dustbin overflow processing method has been disclosed. It comprises an intelligent dustbin, an intelligent garbage truck, a WeChat mini app client, and a host computer monitoring center. The dustbin can detect garbage through an infrared paired transistor, and when the garbage in the dustbin reaches a certain height and blocks the infrared rays, a garbage overflow alarm signal is triggered. This invention is disclosed in CN107918316A. This invention also does not disclose a method for the automation of the function of the driver of the autonomous vehicle.

There has been a driverless garbage truck that has been developed that can be controlled remotely and wirelessly. It comprises a chassis, a compartment, a cab, and a packer. The cab is arranged on the front portion of the upper end of the chassis. The compartment is arranged in the rear portion of the upper end of the chassis. The packer is arranged in the rear end of the compartment. A drain tank is arranged in at the lower end of the packer. A hydraulic cylinder is arranged at the upper end of the side face of the compartment. A video camera is arranged in the cab. A flashing alarm is arranged at the front end of the upper surface of the cab. A controller is arranged in the middle portion of the upper surface of the controller. A laser range finder is arranged on the upper surface of the supporting column. An antenna is arranged in the rear end of the upper surface of the cab. This invention is disclosed in CN106144346A. This invention uses a different method of automation of the waste collections truck than that disclosed in the present invention.

Again, it is worth noting that there are no reports of a control mechanism that has been developed that automates the functions of the driver of the waste collections truck in combination with a robot that replaces the function of the human worker that empties the bins that is found in the patent literature.

SUMMARY OF THE INVENTION

The invention being presented here automates the functions of the driver of the waste collections truck.

It involves a waste collections truck which is designed to follow routes to collect waste using a human to pick up the bins with refuse or other material comprising a truck that includes a drive-by-wire kit, a database storing the collection routes, a mechanism for detecting the position of the human which collects the waste bins and empties them on the back of the truck and a control mechanism that follows the assigned route and speeds or slows down the truck as to minimize the distance that the human will need to walk to empty the trash in the back of the waste collections truck.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

FIG. 7—The truck can monitor the workers to determine when they are finished loading and the truck can move to the next set of bins. The humans may also signal the truck by pressing a switch, using hand signals, giving voice commands, or some combination of signals and commands. The commands and signals could be for either going or waiting.

DETAILED DESCRIPTION OF THE INVENTION

Figure 1:
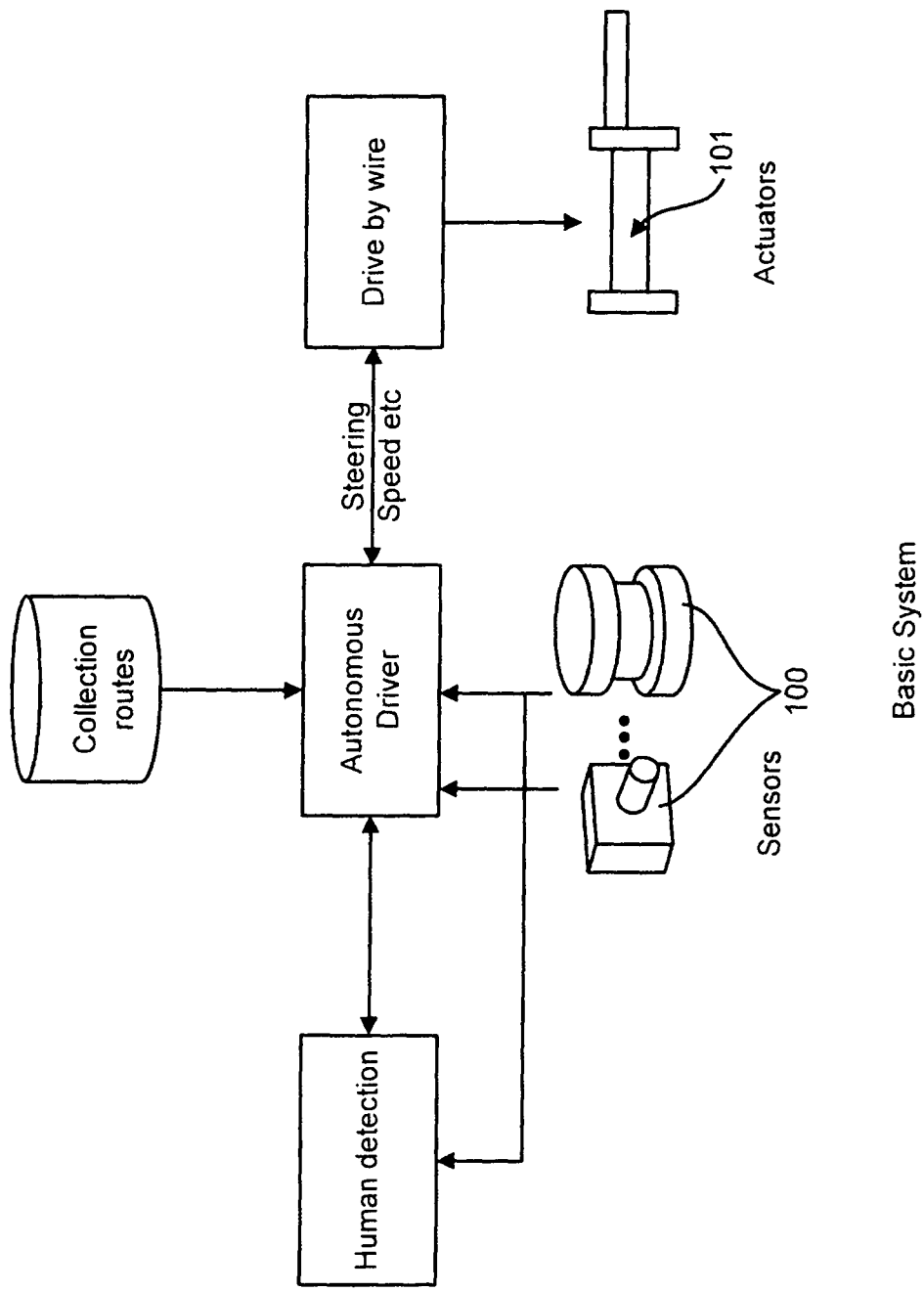
FIG. 1—Schematic of the overall system of the automated waste collections truck.

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth herein, the terms "a," "an," and "the" are not limited to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

Garbage and other refuse collection is performed at regular intervals around the world. The process currently is performed by a team consisting of a garbage truck that carries the refuse that is driven around urban areas at slow speeds. This garbage truck usually contains a large opening in the back. A team of humans controls this truck and collects the bins dumping the refuse on the back of the truck and returning the bins to the curb.

Usually, the driver (human) of the truck positions the truck so as to minimize the distance that the human garbage collectors need to walk with the loaded bins, and slowly drives a route that take the truck to the collections sites. Because currently most residential neighborhoods and some commercial neighborhoods do not use bins and pick up locations that are easy to automatically lift, it is likely that the process of picking up the bins, depositing the refuse on the truck, and returning the bins to the curb will be performed by humans for some time to come.

However, the driver of the truck and the control mechanism to make sure that the truck minimizes the work performed by the humans picking up the bins, can be readily and economically performed using current technology.

The invention being presented here automates the functions of the driver of the garbage truck. It involves an autonomous waste truck designed to follow routes to collect garbage using a human to pick up the bins with refuse or other material comprising an autonomous waste collections truck that includes a drive-by-wire kit, a database storing the collection routes, a mechanism for detecting the position of the human which collects the waste collection bins and empties them on the back of the autonomous waste collections truck and a control mechanism that follows the assigned route and speeds or slows down the truck as to minimize the distance that the human will need to walk to empty the trash in the back of the autonomous waste collections truck.

A drive-by-wire kit is the use of electrical or electro-mechanical systems for performing vehicle functions that are traditionally achieved by mechanical linkages. This technology replaces the traditional mechanical control systems that have electronic control systems using electromechanical actuators and human-machine interfaces such as pedal and steering feel emulators. Many components such as the steering column, intermediate shafts, pumps, hoses, belts, coolers and vacuum servos as well as master cylinders are eliminated from the vehicle.

The autonomous waste collections truck system has a control system that takes under consideration the location of 2 or and more humans emptying the bins. It also controls the speed so that the distances are minimized, taking under consideration that when the human is travelling from the curb to the back of the truck, the bin is likely to be full, while when the bin is being returned to the curb is empty, therefore, the distances are weighted differently for "full" and "empty" bins.

The autonomous waste collections truck system is also equipped with a bin detector which automatically stops as to align the back of the truck with some extra clearance with the detected bins. The trucks are also equipped with sensors that detect if an obstacle is on the route and a controller that automatically stops if the a-priori routes are blocked.

The controller of the autonomous waste collections truck system is aware of the rules of the road and the truck automatically obeys the rules of the road. The location of the waste collector/s (human/s) is sensed using GPS or ranging radios, or LADAR, or stereo vision, or is detected using an EO or IR camera.

GPS refers to the global positioning system and is a satellite-based navigation system made up of at least 24 satellites. It works in any weather conditions, anywhere in the world, 24 hours a day. It was originally put into orbit for military use but were available for civilian use from the 1980s.

Ranging radios are a system of radio transmitting stations, each of which transmits a signal that not only carries identification but also intrinsic value to to navigator in fixing his position.

LADAR refers to Light Detection and Ranging and it is also referred to as LIDAR. It is a surveying method that measures distance to a target by illuminating the target with pulsed laser light and measuring the reflected pulsed with a sensor. The differences in laser return times and wavelengths are used to make 3-D representations of the target that is desired to examine.

Stereo vision refers to the perception of the depth and the three-dimensional structure obtained on the basis of visual information deriving from two eyes by individuals with normally developed binocular vision.

EO camera stands for electro-optical sensor and they are electronic detectors that convert light, or a change in the light, into an electronic signal. They are used in many industrial and consumer applications such as lamps that turn on automatically in response to darkness, position sensors that activate when an object interrupts a light beam, flash detection to synchronize one photography flash to another, and photoelectric sensors that can detect the distance, absence, or presence of an object.

IR camera stands for infrared camera and are non-contact devices that detect infrared energy (heat) and converts it into an electronic signal, which is then processed to produce a thermal image on a video monitor and perform temperature calculations. They operate in wavelengths as long as 14,000 nm.

The control system of the autonomous waste collections truck system advises the human to get into or out of the truck at the end or beginning of the route. Only refuse from certain houses are collected in the neighborhood, and the control system signals the human where are the locations where the refuse needs to be collected.

The control system from the autonomous waste collections truck takes under consideration if the human is hanging from the back of the truck to control speeds and acceleration rates. The human uses an interface such as a switch, verbal gesture, or hand gesture to indicate to the controller in the truck to move to the next location or to wait in the same location.

The controller in the autonomous waste collections truck system automatically avoids contact with stationary obstacles that are present on the route. The controller also has some freedom to adjust the side separation with respect to the route of the autonomous waste collections truck depending on if the vehicles are parked on the road. For example, if there are no vehicles parked on the road, then, the controller will drive the route close to the curb. If there are vehicles parked by the side of the road, the controller will drive the autonomous waste collections truck with sufficient space for safety and taking under consideration that the human and the bin will need to walk between the truck and parked car.

The controller of the autonomous waste collections truck system takes under consideration that parked cars on the side of the road may create a barrier that does not allow the human with the bin to traverse, and positions the truck in areas where there is sufficient space for the human to cross from the road to the curb. The human has an interface that can command the autonomous waste collections truck to automatically move forwards or backwards along the route.

The autonomous waste collections truck system has a set of sensors and algorithms that can differentiate the bins by the type of refuse such as the green bins that are used for recyclable products and the blue bins that are used for regular waste or refuse. The detection can be based on the color, shape, and texture of the bins, or it can use markings/fiducials on the bins such as QR codes, RF tags, RFID tags, or other types of similar tags or markings.

Fiducials are objects placed in the field of view of an imaging system, which appears in the image that is produced, and used as a point of reference or a measure. It could be something either placed into the imaging subject or placed in the reticle of the optical instrument.

QR codes are a type of matrix barcode first designed for the automotive industry in 1994 in Japan. A barcode is a machine-readable optical label that contains information about the item to which it is attached. It consists of an array of black and white squares and used to store information for reading by a camera or a smartphone.

RF tags all send the same signals and simply tell the receiver that something is present. They are used in electronic article surveillance to prevent shoplifting. All the tags are exactly the same, so it doesn't know what you are stealing, but that you are stealing an item. Another RF technology is acousto-magnetic (AM) and involves a pulsed beam of radio waves from the transmitter striking the tag, making it give off a precise frequency radio signal. The receiver picks up the signal, verifies that it is the correct frequency, and then sets off the alarm.

RFID tags work by responding to incoming radio waves from the scanner or the transmitter. There is just enough energy in those radio waves to activate the RFID chip. They uniquely identify the article to which they have been attached to and the radio signal that zaps from the article to the receiver contains a digitally encoded identifier. They beam radio waves in the back of the book, receive the radio signal back from the book, and decode this to figure out a digital code that uniquely identifies the book you want to check out. In addition, RFID tags tend to work at much shorter distances compared to that of RF tags.

The autonomous waste collections truck system has different openings for different types of refuse such as recycling types and the truck will control its position along the route taking under consideration the bin type and the relative position of the opening in the truck for that type of refuse.

In this waste collection truck system, the humans collecting the bins are replaced with robotic systems. These robotic systems un-dock from the autonomous waste collections truck, search for the refuse bins, grab the bins, transport them to the truck, empty the bins, return the bin to the original location which could possibly be the original pose, and finally returns to the truck and docks.

In this system, the marsupial robots do not dock in between bins, and do so only when the battery is low. The marsupial robots are larger robots that are capable of carrying smaller robots. The larger robot is like the "mother" robot and the smaller robots are like the "son" robots. They also follow the same phenomenon in nature by living beings such as kangaroos. The marsupial relationship allows a team of robots to have several advantages such as robustness, faster accomplishment of tasks, and higher quality of the results.

There are different kinds of marsupial robots that could be specialized for use with autonomous waste collection trucks depending on the bin type or the load type.

In this system, the refuse is not packaged in bins. The refuse may be packaged in bags, other containers, or left by the side of the road in an unpackaged form such as in the case of Christmas trees, and other types of items. The marsupial robots weight the refuse before dropping it on the truck. Finally the robotic system uses the number of bins, weight, volume, and/or type of waste as part of an accounting system that can be used to charge the customer for the service by the waste collection company.

FIG. 1 shows an overall schematic of the basic autonomous waste collection system. It consists of a drive by wire kit that is connected to actuators (101) which controls the steering speed and other types of conditions and is connected to the autonomous driver. The autonomous driver is aware of the sensors (100) and the collection routes and this leads to the human detection of the waste.

Actuators are devices that cause a machine or other system to operate. It is a component of a machine that is responsible for moving and controlling a mechanism or system. It basically requires a control signal and a source of energy.

Figure 2:
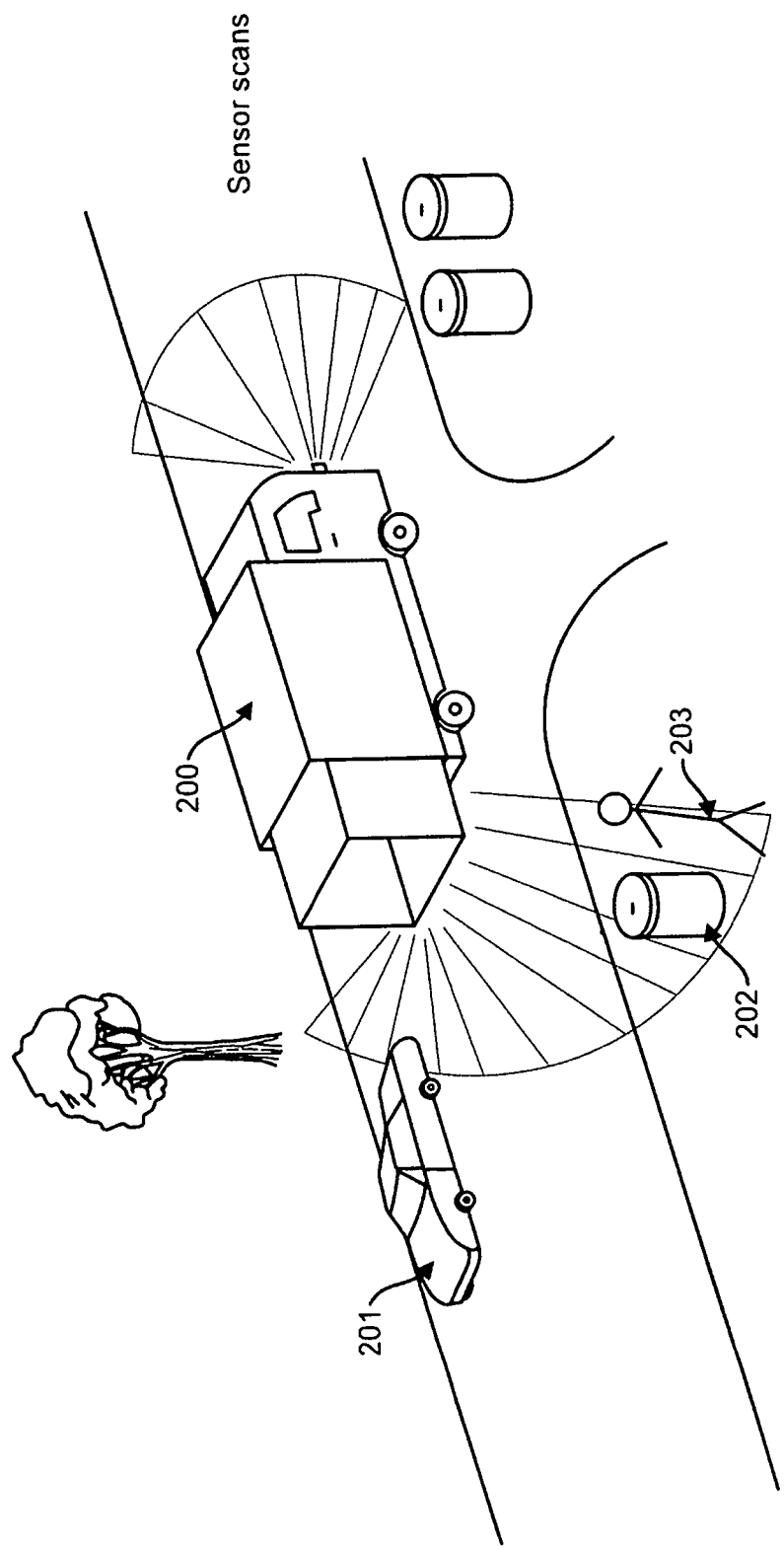
FIG. 2—Figure showing the truck stopping in locations that minimize the time to load refuse. The sensor detects workers location and progress. The sensors detect refuse bins and driving obstacles.

FIG. 2 shows the autonomous waste collection truck (200) stopping in locations that minimize the time to load refuse. The presence of another vehicle (201) nearby is shown. The sensor detects the location of the workers (203) and their progress in the work being performed such as when they are near the refuse bins (202). The sensors also detect the refuse bins as well as driving obstacles.

Figure 3:
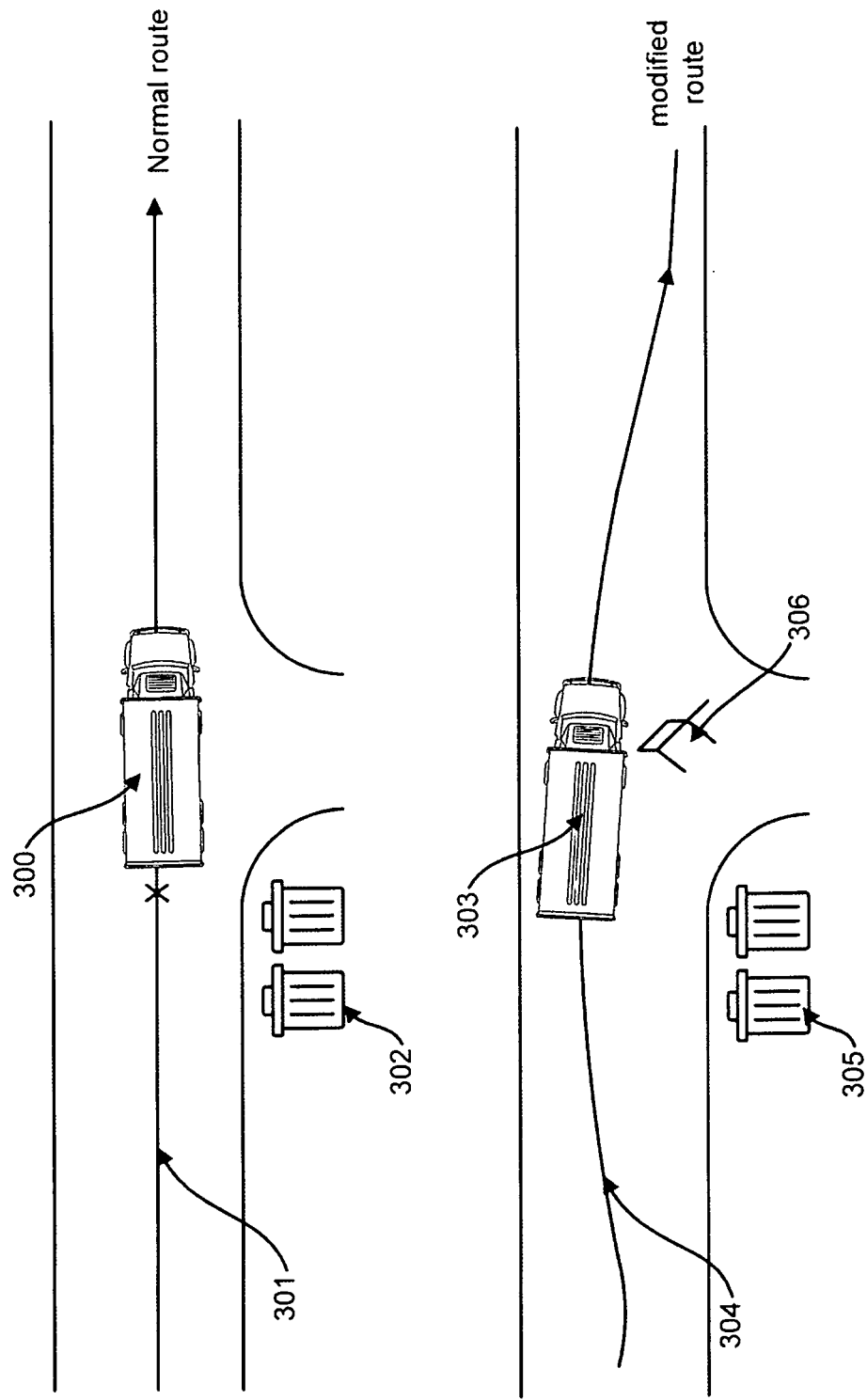
FIG. 3—The truck modifies its route to avoid obstacles and optimize trash pickup time, while maintaining traffic rules.

FIG. 3 shows the autonomous waste collections truck (300, 303) modifying its route to avoid obstacles and optimize trash pickup time while maintaining traffic rules. When there are no obstacles present, the autonomous waste truck follows its normal route (301) for picking up the trash bins (302). When there is an obstacle (306) present, the autonomous waste collections truck follows a modified route (304) for the collection of the trash bins (305).

Figure 4:
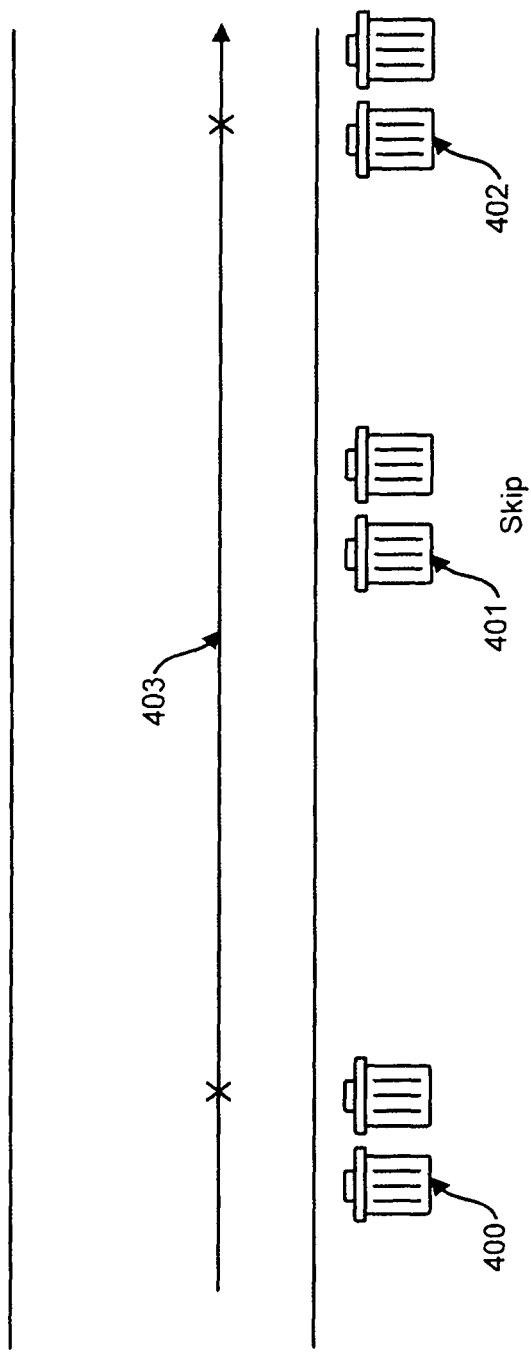
FIG. 4—In this figure, it can be seen that if desired, some bins can be skipped if they are not a customer like in the case if that resident is not a customer.

FIG. 4 shows that some of the waste collection bins can be skipped if they are not part of the collection route due to the resident not being a customer of that waste collection company. Trash bins (400,402) that are part of the route are shown in the figure as well as the middle-skipped trash bins (401). These trash bins are part of a normal route taken by the autonomous trash collections truck.

Figure 5:
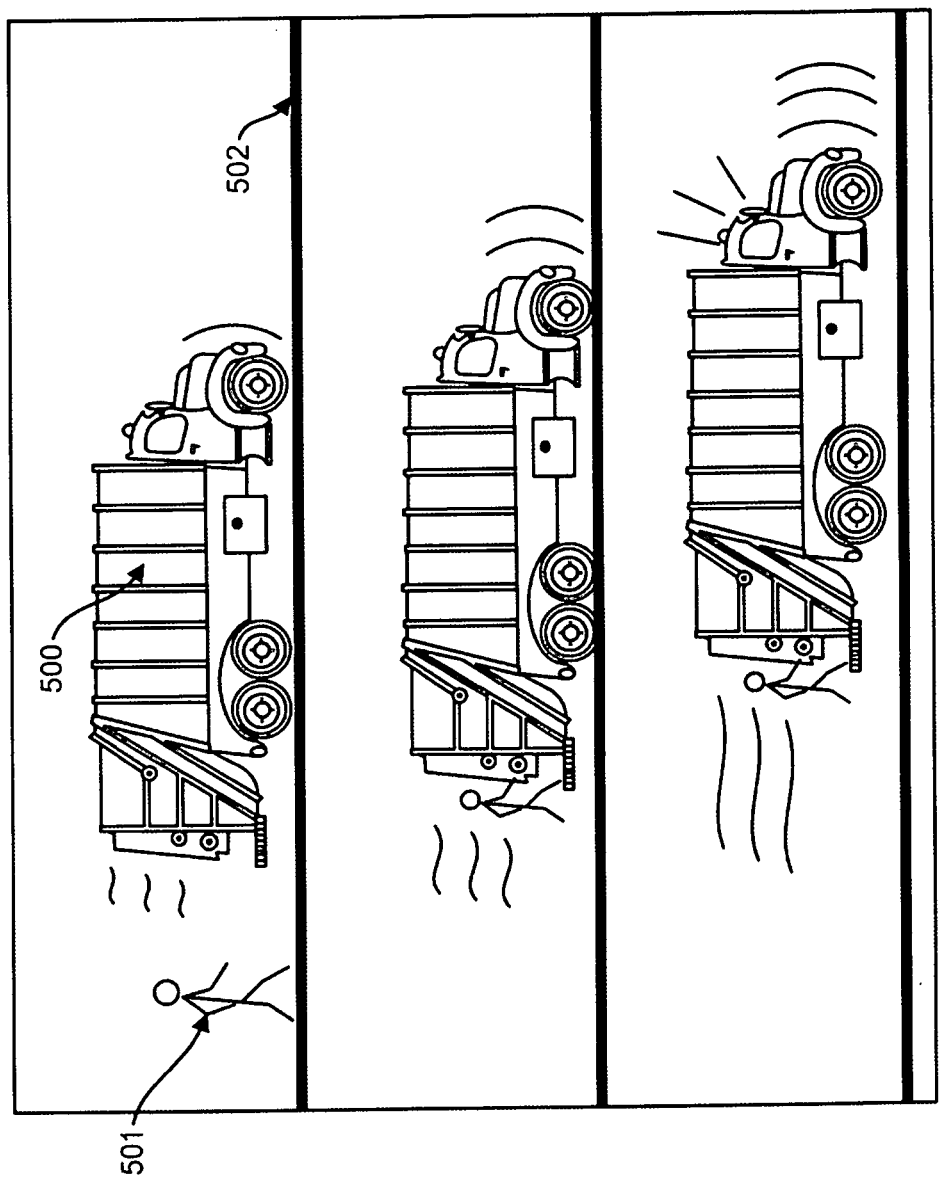
FIG. 5—The truck can vary its speed depending on if the human helper is walking around the truck, riding on the truck or riding inside the cab.

FIG. 5 shows the autonomous waste collections truck (500) varying its speed depending on if the human helper (501) is walking around the truck, riding on the truck, or riding inside the cab.

Figure 6A:
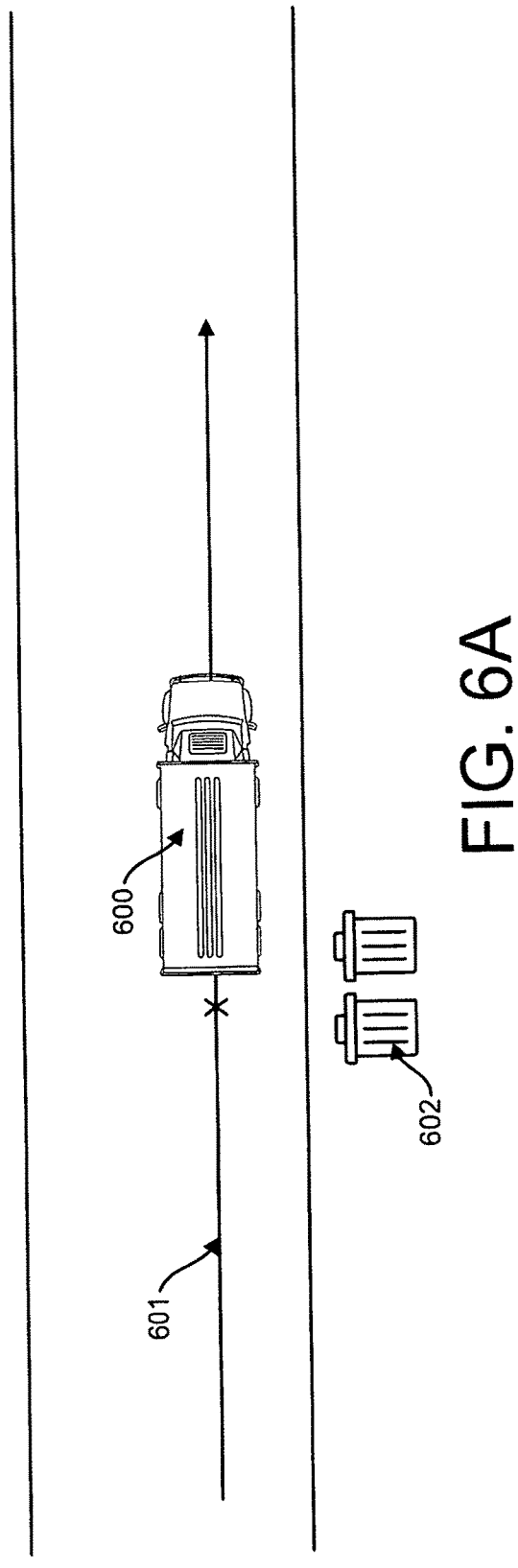
FIG. 6A—the waste collection truck without obstacles and how the truck stops near the curbs and by the bins, FIG. 6B—parked cars and other obstacles can result in modified paths and/or stopping locations.
Figure 6B:
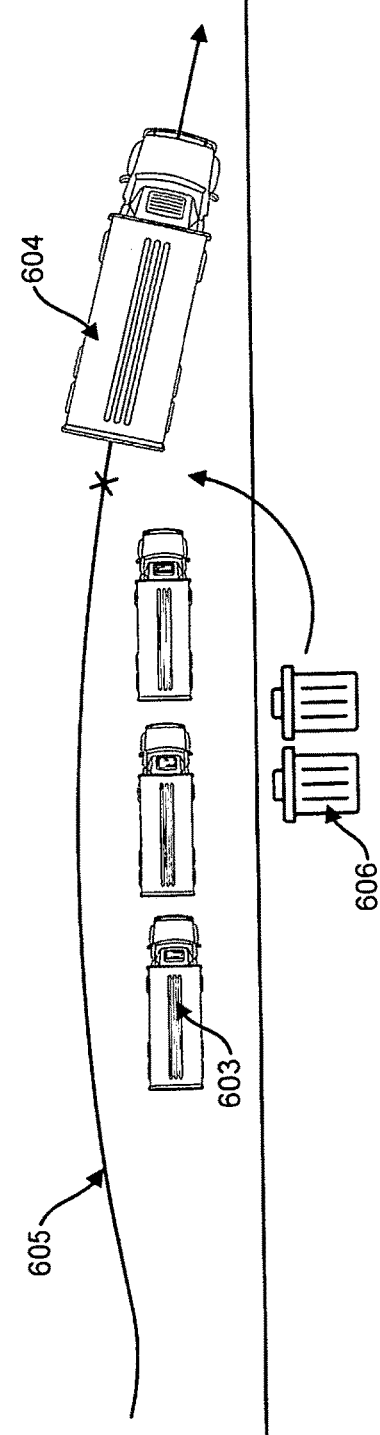

FIG. 6A shows that the waste collection truck (600) stops near the curb and by the bins (602) when there are no obstacles such as other vehicles that are present. In this case, the autonomous waste collections truck (600) follows the normal route (601). FIG. 6B shows that when there are parked vehicles (603) or other obstacles present, it can result in modified paths (605) and/or stopping locations for the autonomous waste collections trucks (604).

FIG. 7 shows the autonomous waste collections truck (700) monitoring the workers (702, 704) to determine when they are finished loading the bins (703) and the truck can move to the next set of bins. The humans may also signal the truck by pressing a switch (701) using hand signals, giving voice commands, or some combination. The commands that are given could be for the truck to go or for the truck to wait.

The embodiments of the invention in which an exclusive property or privilege is claimed are defined as follows:

1. An autonomous waste collection system programmed to follow an assigned collection route to collect waste by picking up bins of refuse, comprising:
    an autonomous truck that includes a drive by wire kit and a GPS navigation device;
    a database storing an assigned collection route;
    an obstacle sensor oriented in a forward direction;
    a bin detector oriented to one side of the autonomous truck;
    a waste collector sensor oriented in a rear direction; and
    an autonomous control system that (i) utilizes data from the GPS navigation device to selectively activate the drive by wire kit to cause the autonomous truck to follow the assigned collection route, (ii) automatically adjusts the assigned route to navigate around any stationary objects detected by the obstacle sensor, (iii) automatically adjusts the speed of the truck based on a location of a waste collector as sensed by the waste collector sensor, and (iv) identifies at least two waste bins based on data from the bin detector and selectively stops next to only one of the identified waste bins.

2. The system of claim 1, wherein the waste collector sensor comprises a pair of ranging radios, one coupled to the autonomous truck and one coupled to the waste collector.

3. The system of claim 1, wherein the waste collector comprises a robotic waste collector, the system further comprising:
    the robotic waste collector that automatically and selectively docks and un-docks from the autonomous truck.

4. The system of claim 3, wherein the robotic waste collector measures at least one of a volume and a weight of the refuse in a bin and wherein an accounting system in communication with the robotic waste collector charges a customer based on the measured at least one of the volume and the weight of the refuse in the bin.

* * * * *